Figure 1:
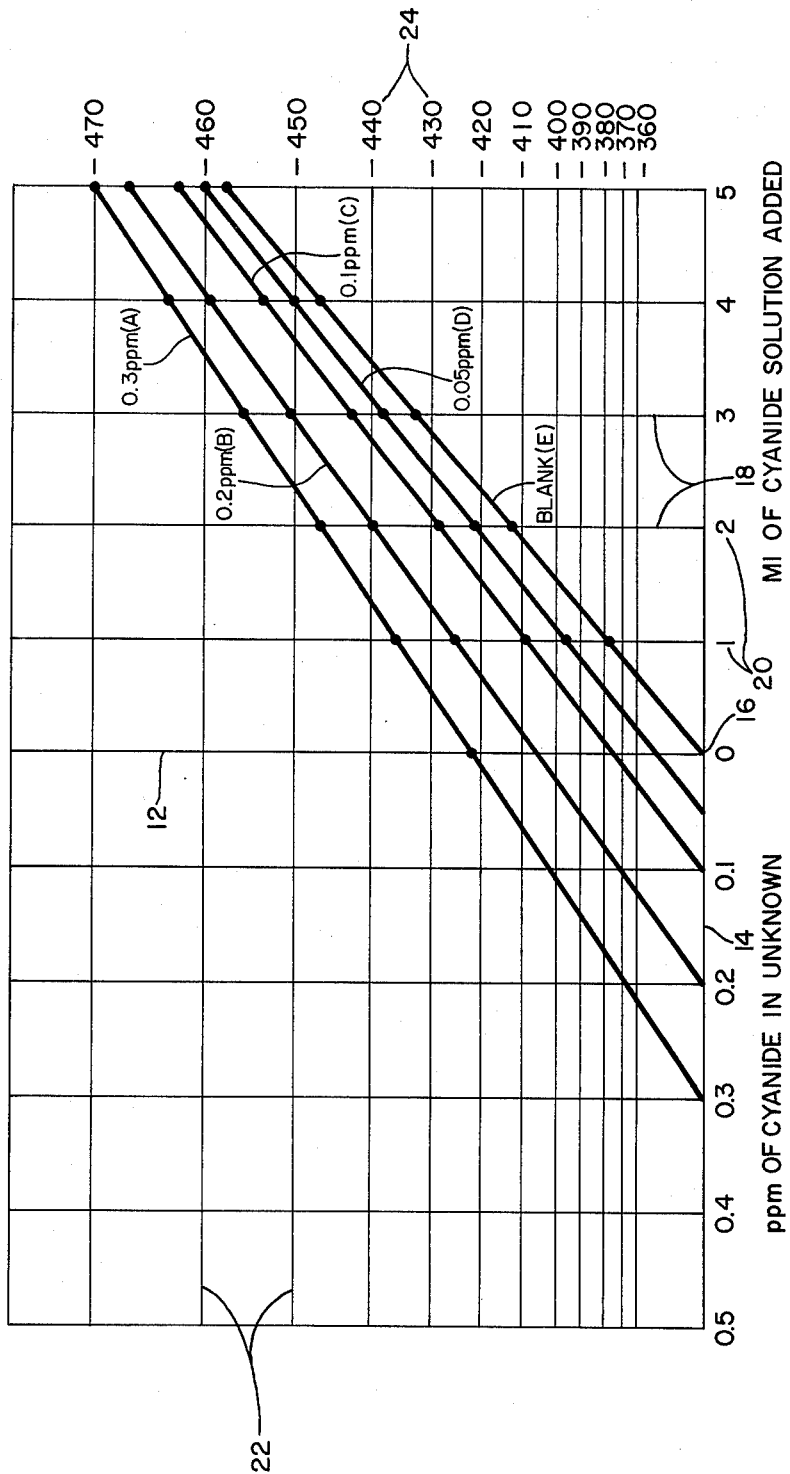

United States Patent [19]
Frant et al.

[11] 3,923,608
[45] Dec. 2, 1975

[54] METHOD OF DETECTING LOW LEVELS OF CYANIDE

[75] Inventors: Martin S. Frant, Newton, Mass.; James Ross, Richmond, Va.; John H. Riseman, Cambridge, Mass.

[73] Assignee: Orion Research Incorporated, Cambridge, Mass.

[22] Filed: Aug. 10, 1972

[21] Appl. No.: 279,336

[52] U.S. Cl............................ 204/1 T; 204/195 M
[51] Int. Cl............................................ G01n 27/46
[58] Field of Search........................ 204/1 T, 195 M

[56] References Cited
UNITED STATES PATENTS
3,672,962   6/1972   Frant et al...................... 204/195 M OTHER PUBLICATIONS
National Bureau of Standards Special Pub. 314, 1969, pp. 367–370 and 430.
Fleet et al., "Analytical Letters", 4(7), 1971, pp. 425–435.

*Primary Examiner*—T. Tung
*Attorney, Agent, or Firm*—Robert J. Schiller

[57] ABSTRACT

A system for electrochemical measurement of the concentration of cyanide ions in titrations utilizing Nerstian responsive electrochemical devices for sensing silver ions. The system involves successive additions of a standard solution containing cyanide ion to the sample, in the presence of an indicator comprising an at least partially dissociable silver cyanide complex. Electrode potential measurements of the potentials for the silver ion in equilibrium with the cyanide ion are taken before and after each addition. The potentials are plotted antilogarithmically versus the known increase in concentration of the ion of interest. The original concentration of the ion of interest is obtained by extrapolation of the plot using Gran's method. The system is especially useful for trace sample determinations.

12 Claims, 2 Drawing Figures

METHOD OF DETECTING LOW LEVELS OF CYANIDE

This invention relates to electrochemical analytical techniques, and more particuarly to a process for electrochemical measurement of low concentrations or traces of a sample ion species in a solution.

Various monitoring or sensing systems using ion-sensitive electrodes are known in the art for providing information relating to the activity of an ionic species of interest, or to its concentration. Such an ion-sensitive electrode typically provides an electrical signal which is a function of the logarithm of the activity of the ionic species to which the electrode is sensitive, i.e., exhibits a response which is substantially according to the well-known Nernst equation. A large number of such electrodes are known and described in detail in the literature, as for example in R.A. Durst, "Ion-Sensitive Electrodes", National Bureau of Standards, special publication 134 (1969).

The lower limit of detection for most specific ion electrodes is determined by the small but finite aqueous solubility of the chemical constituency of the sensing element. Since a sensing element typically may dissolve to form an ionic species to which the electrode responds, the electrode may "interfere" with itself in dilute solutions. Theoretically, the absolute low limit of detection is thus a function of the smallest increase in electrode potential which unequivocally indicates the presence of the ion being secured. However, from a practical standpoint, since electrode potentials are not very stable at very low concentrations of the ion of interest and tend to drift and to respond to interferences, it is difficult to obtain accurate measurements at very low levels. Therefore, the lower limit of detection is the so-called "mud level" which is the apparent concentration of a zero concentration solution, as read from an extrapolation of the Nernst calibration curve. Details of the "mud level" are described in the literature, as for example in the article "Mud and Water", Orion Newsletter, Orion Research Incorporated, Cambridge, Mass., January/ February (1971). Other problems which may be encountered while operating at very low concentration levels, include interference from other ions in the solution, slow electrode response, and attack upon the electrode itself.

In some cases, the concentration of the ion of interest may be below the mud level, as may be encountered, for example, in the monitoring for trace cyanide in industrial waste waters from metal plating, steel coking or other industrial processes. For example, known cyanide ion electrodes can be used for cyanide determinations at levels as low as about 0.3 ppm. (J.W. Ross, Jr., "Ion Selective Electrodes", National Bureau of Standards, Publication No. 314 (1969). However, it may be desired to monitor cyanide concentrations at levels of 0.1 ppm or below.

A principal object of the present invention is to provide a system for determining very low concentrations of cyanide ions in solution, using silver-ion sensitive electrodes.

A more specific object is to provide a method of measuring trace amounts, e.g. 0.1 ppm or less, of cyanide ions in aqueous solution.

Generally, these objects are effected by a standard addition procedure in the presence of an indicator comprising a silver cyanide-complex capable of dissociating into ionic constituents.

The so-called "standard addition", or "known addition" method is well known in the art. The method first appears to have been suggested by R.M. Garrels, "Glass Electrodes for Hydrogen and Other Cations", George Eiseman, Marcel Decker, (1967), p. 355. The theory and application of this method was greatly expanded in an article entitled "To Skin a Cat", published in the July 1969 edition of the Newsletter/-Specific Ion Electrode Technology, pages 9–11, published by Orion Research Incorporated, Cambridge, Mass. The procedure in these applications was to use an ion-sensing electrode from which an initial reading was obtained in the sample solution. Then a known amount of the ion of interest was added to the sample solution, and from the change in potential at the electrode, it was possible to calculate the original concentration. This beaker procedure was adapted for use with continuous monitors by Eckfeldt and Proctor (working with Howie and Lower) in a paper presented at the 29th Annual Meeting of the International Water Conference, November 19–21, 1968, but was however, essentially the same procedure used in the beaker method.

The process of the present invention involves at least two quantitive electrochemical determinations of silver ion made by an electrode sensitive to silver ions, in the presence of a soluble silver cyanide complex before and after the mixture of the complex with a solution containing a known quantity of free cyanide ion, and at least one such determination after mixture with the complex of a sample solution containing an unknown concentration of free cyanide ion. From the measurements made, the concentration of cyanide ion in the unknown solution can be computed.

Two variations on the foregoing method can be employed. In the first, a known amount of standard solution containing a known concentration of free cyanide ion is added to an indicator solution containing the silver cyanide complex, and an electrode measurement is taken of a potential representing the silver ion concentration in the mixture. At least one more known quantity of the standard solution is then added and a second measurement is taken by the silver-sensitive electrode. From such measurements (together with others if desired) and the known incremental changes in cyanide concentration due to the sequential addition of the known quantities of standard solution, one can calibrate the electrode with respect to the indicator solution. Another portion of the indicator solution is then mixed with the sample which contains an unknown amount of free cyanide ion, and a reading of the silver activity in this latter mixture is taken with the silver-sensitive electrode. That reading can be then compared to the calibration curve so that the determination of the concentration of free cyanide ion in the sample solution can readily be ascertained.

In the second variation of the process of the invention, the sample solution and indicator solution are initially mixed with one another and a reading taken of the silver ion activity with a silver-sensitive electrode. A known quantity of the standard solution is then added to the mixture and another reading is taken by the silver-sensitive electrode. Then a second addition is made of the standard solution and a third reading taken on the electrode. On the basis of the three readings, one can compute the free cyanide concentration in the original sample solution typically by Gran's method. For example, the three (or preferably more) electrode readings are plotted antilogarithmically against the linear incremental increases in cyanide concentration from the known additions. If the measurements are taken in a region where the dissociation of the complex is minimal, a straight line can be fitted approximately to the plotted points. The resulting straight line may, as taught by Gran, be extrapolated to the added titrant axis, and the point of intersection with the latter is the equivalence point of the original concentration of free cyanide ion in the original solution. Gran's method is described more fully by G. Gran, *The Analyst*, Vol. 77, p. 661 (1952) and by Rossotti and Rossotti, *Journal Chem. Ed.*, Vol. 42, p. 375 (1965).

Other objects of the invention will in part be obvious and will in part appear hereinafter. The invention accordingly comprises the process including the several steps and relation of one or more of such steps with respect to each other, all of which are exemplified in the following detailed disclosure and the scope of the application of which wil be indicated in the claims.

Figure 2:
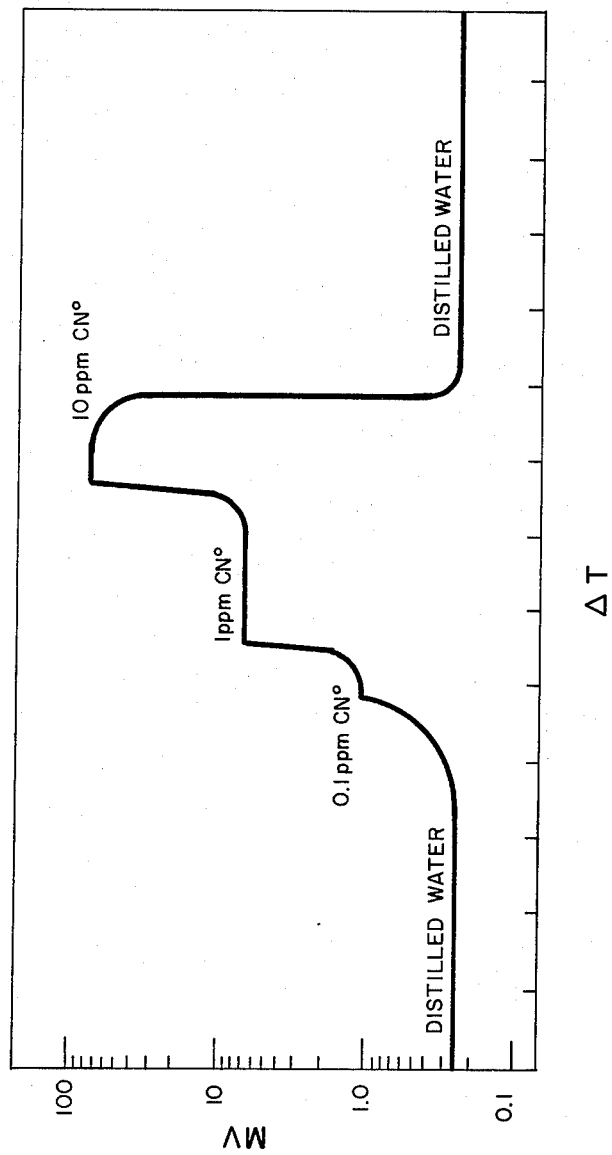

For a fuller understanding of the nature and objects of the present invention, reference should be had to the following detailed description taken in connection with the accompanying drawing wherein:

FIG. 1 is a Gran's Plot, without volume correction of a preferred embodiment of the invention showing the known additions of a standard solution to sample solutions containing various initial levels of an ion of interest; and FIG. 2 is a standardization curve from a time chart showing the effect of the method of the invention in a continuous monitor.

The process employs a silver ion-sensitive electrode, examples of which are well known in the art. Typically, one such electrode employs as the ion-sensitive portion thereof a compressed pellet or membrane of $Ag_2S$ substantially free of either metallic silver or free sulfur.

The silver-complex indicator used in the method of the present invention is an alkali silver cyanide complex soluble in aqueous solution and capable of multiple dissociation to produce free cyanide ions. Typically, such an indicator is $NaAg(CN)_2$, $KAg(CN)_2$ or the like.

In order to simplify the computations necessary with the second of the variations above noted in the method of the inventions, one may carry out Gran's method employing a Gran's plot.

Referring now to FIG. 1, there is shown a coordinate system comprising vertical axis or ordinate 12 and horizontal axis or abscissa 14 which intersect at origin 16. A set of vertical lines 18 are equally spaced apart and are parallel to one another and the ordinate. Lines 18 intersect abscissa 14 at a set of points 20 which form a linear scale. A set of horizontal lines 22 are provided and are spaced anti-logarithmically apart with the distance between adjacent lines 22 increasing exponentially from the origin 16. Lines 22 intersect ordinate 12 at a set of points 24 which form an anti-logarithmic scale.

The scale formed by the points 20 on abscissa 14 is intended in part to represent the known volume of titrant added. Arbitrary values of volume may be assigned to the divisions between adjacent points 20 from origin 16 which represents the maximum (or zero) of the total amount of titrant to be added. The remainder of the abscissa is divided in the same linear scale to which however values in parts per $10^n$ (where $n$ is some arbitrary integer) are assigned a linear scale starting from a minimum or zero at point 16. For example, each division may represent one-tenth milliliter, one milliliter, or two milliliters. This is simply a matter of choice and practicality. In the instant examples which follow each division is chosen to represent one-tenth milliliter.

The scale formed by points 24 on ordinate 12 is used to represent the electrode potential readings of ion activity as determined by a specific ion electrode. Given the electrode potential, the activity is determined by solving the well known Nernst equation:
$$E = E_0 + N \log A$$
where E is the electrode potential, $E_0$ is a constant determined by reference electrodes, N is the Nernst factor, and A is the activity of the sensed ion. Accordingly, the activity is proportional to the anti-log of E/N, and the scale formed by points 24 is intended to be representative of activity of the sensed ion.

As thus described FIG. 1 comprises a Gran's Plot graph paper known in the art. The curves plotted in FIG. 1 will be described in detail in Examples II and III following.

The indicator concentration is not crucial within rather broad limits, since the only requirement imposed by the method is that the concentration of $Ag(CN)_2^-$ be constant during the known additions. From a practical standpoint, however, the indicator concentration should not be more than about ten times or less than about 0.5 times the minimum concentration of the ion of interest to be detected. Indicator solutions require the presence of a small excess (about one percent) of cyanide to prevent precipitation of $AgAg(CN)_2$. This excess cyanide will be measured as sample cyanide in the Gran's plot. At the same time, too low an indicator concentration results in slow electrode response time. A reasonable compromise is an indicator level of about $10^{-5}$ M which permits detection of cyanide to about 0.03 ppm.

An upper limit of sample cyanide concentration is imposed by the formation of higher silver cyano complexes. The method assumes that in measuring $CN^-$ the only silver complex present is $Ag(CN)_2^-$. At sample cyanide levels above $10^{-2}$ M (260 pp,), significant amounts of $Ag(CN)_3^-$ are present. Such samples should be diluted prior to analysis.

The permissible sample pH range is limited on the acid side by the formation of HCN. On the basic side, the indicator may react to form AgOHCN. As a result, it is necessary to adjust sample pH to the range 11–12 prior to analysis.

In wastewaters and other samples containing unknown components, interference from metal ions which form some stable cyanide complexes can be expected, and require the addition of a masking agent prior to the sample solution. Salts of ethylene diamine tetra acetic acid (EDTA) have been found to be effective for this purpose. In normal wastewaters $10^{-3} - 10^{-4}$ EDTA levels are adequate. If high levels of metals are expected, in large excess compared to the total cyanide, $10^{-2}$ M EDTA or more may be required. Anions will not interfere unless they can react with the very stable $Ag(CN)_2^-$ indicator complex. The only anion likely to be present which would interfere is sulfide, which can be removed by the addition of a slight excess of $Pb^{++}$. Up to a hundredfold excess of lead over cyanide does not appear to cause any problems. Ammonia, which forms weaker complexes with silver, will not interfere, even when present at a $10^{-3}$ — fold excess. Only the metals which form extremely stable complexes such as cobalt, iron, gold and silver, will not be dissociated and measured by this procedure.

A silver-complex indicator solution for use in the following example was prepared by titrating KCN solution with $AgNO_3$ solution in a beaker. The beaker contained two electrodes, a silver-sensing electrode and a double junction reference electrode (respectively Model Nos. 94–16 and 94–19 available commercially from Orion Research Incorporated, Cambridge, Mass.). Each electrode was connected to an amplifier and readout meter (Model 801 pH/mv meter available commercially from Orion Research Incorporated, Cambridge, Mass.).

An 100 ml. portion of the approximately $10^{-3}$M KCN was placed in a beaker and then titrated with $10^{-2}$ M $AgNO_3$. The solution was stirred for 30 seconds after each addition of $AgNO_3$ and electrode readings were then taken and plotted on rectilineal paper in known manner. Addition of $AgNO_3$ was continued until meter reading corresponding to about 98–99% of the way to the first endpoint (formation of $KAg(CN_2)$ was achieved as indicated by a sudden rapid change in the potentiometric reading. This left a slight excess of cyanide which was desirable to prevent precipitation of $AgAg(CN)_2$. This indicator solution is stable for several months if kept in a tightly stoppered bottle.

EXAMPLE I

An "unknown" solution of KCN is prepared having 0.3 ppm free cyanide ion. A 100 ml. portion of this "unknown" KCN solution adjusted to pH 11–12 was placed in a beaker containing a silver-sensing electrode and a reference electrode (respectively Model Nos. 94–16 and 94–19 identified above). The electrodes were connected to an amplifier and readout meter (Orion Model 801). A one ml. portion of the solution of the $KAg(CN)_2$ indicator solution prepared as above was added to the contents of the beaker. The contents were stirred for about one minute. A potentiometric potential reading was then made and the result is recorded on a semi-antilograithmic graph paper (Catalog No. 90–00–92, available commercially from Orion Research Incorporated, Cambridge, Mass.). As seen in line A of FIG. 1, the initial potential reading was about −420 mv. Five successive additions of 0.1 ppm standard KCN solution of 1 ml. each were made to the contents of the beaker. The contents were stirred for about one minute after each addition and potentiometric potential readings were made. The results were recorded on the Gran's plot paper wherein the abscissa was divided on one side of a zero ordinate in linear increments each corresponding to a quantity of cyanide solution added, and on the other side of the zero ordinate in like linear increments each identified in parts per million of cyanide in the unknown. The ordinate is antilogarithmically scaled in millivolts. As seen in the drawing, the potentiometric readings defined a substantially straight line A in FIG. 1, indicating that the activity increased antilogarithmically with the additions, as expected. Using Gran's method, line A was extrapolated to the abscissa. As seen in FIG. 1 line A crosses the abscissa at 0.3 ppm which was exactly in accordance with the actual amount of CN.

EXAMPLE II

The procedure of Example I was repeated using sample solutions containing predetermined concentrations of 0.2 ppm cyanide, 0.1 ppm cyanide, 0.05 ppm cyanide, and a sample solution of distilled water. The potentiometric readings were plotted in FIG. 1 as lines B, C, D and E, respectively. Using Gran's method, lines B, C, D and E were extrapolated to the horizontal axis. The point at which each line crosses the horizontal axis was noted. In each case the amount of cyanide determined by the procedure corresponded exactly with the actual amount of cyanide employed.

EXAMPLES III – VIII

In determination of the concentration of an ion of interest, e.g. in industrial wastes, various metal ions may be present which could theoretically form complexes with some of the ion of interest. If this happens, the results may not be reliable. For example, an industrial waste water which is to be measured for cyanide ion concentration may contain one or more ions of cadmium, chromium, copper, nickel and zinc, all of which are capable of forming complexes with cyanide. The purpose of these examples is to see if such complexing metals can be masked.

Additional sample solutions containing 0.2 ppm cyanide were prepared and analyzed. In each case a complexing metal was added to the sample solution as follows:

| Example No. | Complexing Metal |
| --- | --- |
| III | $2 \times 10^{-3}\ Cd^{++}$ |
| IV | $2 \times 10^{-3}\ Cr^{+++}$ |
| V | $1 \times 10^{-3}\ Cu^{+}$ |
| VI | $1 \times 10^{-3}\ Ni^{++}$ |
| VIII | $1 \times 10^{-3}\ Zn^{++}$ |

For samples containing $Zn^{++}$, $Cd^{++}$, $Ni^{++}$, $Cu^{+}$ and $Cr^{+++}$, typically 1 ml of $10^{-1}$ M disodium EDTA was added as a masking agent. In the case of $Cu^{+++}$, $Cu^{+}$ and $Ni^{++}$, the pH of the samples was adjusted to 4 with acetic acid, and the solutions were then heated to about 50°C for five minutes to destroy the cyanide complexes. No loss of cyanide was detected during the heating as indicated by the absence of any odor of HCN.

All samples were then adjusted to pH 11 with KOH. Electrodes were inserted into the samples, 1 ml. of $KAg(CN)_2$ indicator solution prepared as earlier described was added, and potential readings were taken initially and after successive 1 ml. incremental additions of 0.01 ppm standard KCN solution.

The potential readings were plotted on Gran's Plot Paper and the results were extrapolated to the horizontal axes to give the following results:

| Example | Metal | EDTA | CN Found | Actual CN | % Error |
| --- | --- | --- | --- | --- | --- |
| III | $Cd^{++}$ | 0.2 M | 2.05 | 2.00 | 2.5 |
| IV | $Cr^{+++}$ | 0.2 M | 1.95 | 2.00 | 2.5 |
| V | $Cu^{+}$ | 0.05 M | 2.0 | 2.00 | 0 |
| VI | $Ni^{++}$ | 0.05 M | 1.95 | 2.00 | 2.5 |
| VIII | $Zn^{++}$ | 0.05 M | 1.95 | 2.00 | 2.5 |

EXAMPLES VIII – XII

The procedures of Examples III – VII were repeated with sample solutions containing 0.2 ppm cyanide and $1 \times 10^{-4}$ ppm complexing metal added with the following results:

| Example | Metal | EDTA | CN Found | CN Actual | % Error |
|---|---|---|---|---|---|
| VIII | $1 \times 10^{-4}$ Cd$^{++}$ | 0.02 M | 0.205 | 0.20 | 2.5 |
| IX | $1 \times 10^{-4}$ Cr$^{+++}$ | 0.02 M | 0.20 | 0.20 | 0 |
| X | $1 \times 10^{-4}$ Cu$^{+}$ | 0.02 M | 0.205 | 0.20 | 2.5 |
| XI | $1 \times 10^{-4}$ Ni$^{++}$ | 0.02 M | 0.21 | 0.20 | 0 |
| XII | $1 \times 10^{-4}$ Zn$^{++}$ | 0.02 M | 0.21 | 0.20 | 5.0 |

EXAMPLE XIII

To a 100 ml. solution containing 1 ml of the KAg(CN)$_2$ indicator solution prepared as described earlier and 99 ml water, was added successively five 1 ml. portions of 0.1 ppm standard KCN solution, readings being taken of silver activity prior to the first, after the last and between each successive addition. The readings were plotted against concentration on semilog paper to obtain a calibration curve.

The beaker and electrodes were then flushed with distilled water and 100 ml. of an "unknown" solution of CN$^-$ (actually 0.3 ppm CN$^-$) mixed in the cleaned beaker with a fresh 1 ml. portion of the indicator solution. The silver activity potential read from the meter connected to the electrode was substantially identical to the point on the calibration curve indicative of the addition of three successive 1 ml. portions of 0.1 ppm standard KCN solution.

EXAMPLE XIV

A continuous cyanide-sensing monitor was constructed according to the above principles. A cyanide-containing waste stream was bled to the inlet of a monitor so as to remove approximately a 2.5 ml per minute sample from the stream. The sample flow passed through a three-way valve (which alternately supplies known cyanide solutions) to a mixing tee. At the tee, an acid reagent ($2.5 \times 10^{-1}$ M acetic acid, 0.1 M Na$_2$ EDTA, and 0.1 M NaF) was added at a flow rate one-tenth that of the sample flow rate. The mixed stream then flowed through a heater coil of sufficient dimensions so that the stream could be kept at 85°C for 3 minutes. The mixed stream was then cooled and mixed with an equal flow of an alkaline reagent, containing indicator solution comprising $10^{-4}$ M KAg(CN)$_2$, and 1M K$_2$CO$_3$. These streams were mixed thoroughly and then sent to an electrode chamber held at 40°C, and containing a silver sensing electrode (Orion Model 94–16) and a fluoride-sensing electrode (Orion Model 94–09 which served as a reference electrode. The electrical output was compared with outputs when known standard solutions of CN$^-$ were introduced at the three-way valve and run through in place of the sample stream. Results of such a standardization are shown in FIG. 2 for free cyanide levels of 10 ppm to "zero" ppm (distilled water). The system is completely stable in the absence of added cyanide (distilled water sample); the lower limit of detection is about 0.025 ppm; and any sample value up to 10 ppm can be read directly from the calibration curve.

The nature of electrochemical measurements achieved by the present invention can be seen from the following considerations exemplary for cyanide measurements using a silver ion electrode and a KAg(CN)$_2$ indicator.

In the electrochemical measurement of an ion species, an electrode responds to the activity of the sample ion S$^+$ in solution to provide an output signal E$_s$ substantially according to the equation $$(1) \quad E = E_n + N \log A = \text{Constant} + \frac{2.3\,RT}{F} \log A$$

where RT/F is the well-known constant slope in accordance with the Nernst equation, and A is the activity of the sample ion. The present invention resides in the recognition that for a given concentration I of silver indicator (e.g. Ag(CN)$_2^-$) the concentration of the ion of interest (CN$^-$) in the solution is related to the silver dissociated from the indicator I according to the equation:

$$(2) \quad (Ag^+) = \frac{I}{\beta_2 (CN^-)^2}$$

where $\beta_2$ is the overall formation constant for Ag(CN)$^-_2$. Since the ionic strength of a sample solution normally does not change appreciably during the course of a titration, change in the ionic strength can be ignored, and equation (2) can be approximated as:

$$(3) \quad (Ag)_N^+ = \frac{I}{\beta_2 C + \frac{nSV_a}{V}}$$

where C is the concentration of the ion of interest in the original sample concentration, S is the concentration of the ion of interest in the standard addition solution (e.g. in the form of the liquid,) Va is the volume of each increment of standard solution, n is the number of increments, and V is the total volume.

Substituting equation (3) into equation (1), the electrode potential after n known additions is thus:

$$(4) \quad E_n = \text{Constant} + \frac{2.3RT}{F} \log \frac{I}{\beta_2} -$$

$$\frac{(2)(2.3RT)}{F} \log C + \frac{nSv_a}{V}$$

or $$(5) \quad \text{Antilog} \frac{EF}{(2)(2.3RT)} = K'C + \frac{nSv_a}{V}$$

where K is constant.
Setting $$C = \frac{nSv_a}{V}$$

gives the equivalence point. The concentration S of the ion of interest in the standard solution can vary over a wide range and should be such that the amount of standard solution added will not significantly change the ionic strength of the system. Convenient and precise extrapolation dictates that the concentration be chosen with due regard for the anticipated level of ion in the sample as follows:

$$S = \frac{C_{max}V}{V_a}$$

where $C_{max}$ is the maximum level of ion anticipated in the sample. For example, if V is 100 ml., $V_a$ is 1 ml. and $C_{max}$ is 1 ppm, then an appropriate amount of S would be 100 ppm.

It should be noted that the present invention has unique advantages. First, the system may be used to measure concentrations of ions over a wide range of concentration. Secondly, the system responds quickly and in a substantially theoretical manner even when a small amount of the ion of interest is present. Thirdly, even trace amounts of ions may be quickly and accurately measured.

Since certain changes may be made in the above method without departing from the scope of the invention herein involved, it is intended that all matter contained in the above description or shown in the accompanying drawings shall be interpreted in an illustrative and not in a limiting sense.

What is claimed is:

1. Method of determining with an electrode assembly sensitive to silver ions, the concentration particularly of low level concentrations of free cyanide ion in a sample liquid, said method comprising the steps of; measuring with an electrode sensitive to silver ions, in the presence of a dissociated soluble silver cyanide complex, before and after mixture of said complex with known volumes of a standard solution containing known quantities of free cyanide ion, the silver ion activity in the mixture; measuring with an electrode sensitive to silver ions, after mixture of said complex with said sample liquid, the silver ion activity of the latter mixture; and computing from said measurements the original concentration of free cyanide ions in said sample liquid.

2. Method as defined in claim 1 wherein said complex comprises $Ag(CN)_2^-$.

3. Method as defined in claim 1 including the step of establishing the pH of said sample liquid in the range of between about 11 to 12 prior to measuring the silver ion activity in the mixture thereof with said complex.

4. Method as defined in claim 1 including the steps of; first mixing a quantity of said complex with said sample liquid, and thence mixing successive said known volumes of standard solution to said mixture of complex and sample liquid.

5. method as defined in claim 4 wherein said step of computing includes determining the antilogarithm of each measurement of silver ion activity made, and computing by Gran's method from said antilogarithm and the known quantities of free cyanide ion added through successive known volumes of standard solution, the equivalence value of the original concentration of free cyanide ion in said sample liquid.

6. Method as defined in claim 4 wherein said step of computing includes plotting said measurements on a graph antilogarthmically versus the increase in quantity of cyanide ion from addition of said known volumes of standard solution, and
extrapolating the plot to the axis regarding the increase in quantity of cyanide ion, the intersection of said plot and axis being the equivalence point of the original concentration of $CN^-$ in said sample liquid.

7. The method as defined in claim 4 wherein said complex is added to said sample liquid in a concentration between about 0.5 to 10 times the minimum concentration of $CN^-$ to be determined.

8. Method as defined in claim 1 including the steps of;
first mixing a first quantity of said complex with successive volumes of said standard solution, and
thence mixing a second quantity of said complex with said sample liquid.

9. Method as defined in claim 8 wherein said step of computing includes determining the functional dependence of said measurements upon the known quantities of free cyanide ion added through successive volumes of said standard solution, and establishing according to said functional dependence the value, in terms of concentration of free cyanide ion, of the measurement of silver ion activity made after mixture of said complex with said sample liquid.

10. Method as defined in claim 1 including the step of adding to said sample liquid prior to measurement of the silver ion activity in the mixture of said sample liquid and said complex, a masking agent which complexes with metal ions which would tend to interfere with the latter measurement.

11. Method as defined in claim 10 wherein said agent is a salt of ethylene diamine tetracetic acid.

12. Method as defined in claim 11 wherein said agent is added at a level between about $10^{-1}M$ and $10^{-4}M$.

* * * * *